United States Patent Office 3,345,377
Patented Oct. 3, 1967

---

3,345,377
THIOCARBAMIC ACID-S-ESTERS OF BENZIMIDAZOLES
Karl Goliasch, Schildgen, and Heinrich Pelster and Hans Scheinpflug, Leverkusen, Germany, assignors to Farbenfabriken Bayer Aktiengesellschaft, Leverkusen, Germany, a corporation of Germany
No Drawing. Filed Dec. 23, 1964, Ser. No. 420,813
Claims priority, application Germany, Jan. 25, 1964, F 41,834
8 Claims. (Cl. 260—309.2)

The present invention relates to new thiocarbamic acid-S-esters which have fungitoxic properties, and to a process for the production thereof.

It is an object of the present invention to disclose new thiocarbamic acid-S-esters which have fungitoxic properties. Another object of the invention consists in providing new agents for combating phytopathogenic fungi. It is also an object to provide a process for the production of the new thiocarbamic acid-S-esters. Further objects can be seen from the following description and the examples.

It has been found that the new thiocarbamic acid-S-esters of the general formula

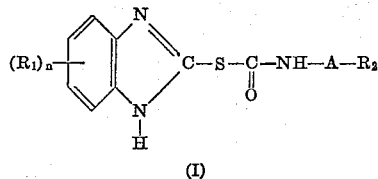

(I)

in which $R_1$ stands for hydrogen, alkyl, alkoxy and/or halogen,
A stands for alkylene with 1–10 carbon atoms.
$R_2$ stands for halogen, alkoxy, haloalkoxy, alkyl-cycloalkoxy or alkylmercapto, and
$n$ stands for an integer of 1–2, have strong fungitoxic properties.

It has also been found that thiocarbamic acid-S-esters of the Formula I are obtained, when mercapto-benzimidazoles of the general formula

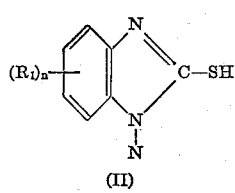

(II)

in which $R_1$ and $n$ have the meaning stated above, are reacted, in the presence of a base, with isocyanic acid esters of the general formula $$R_2\text{—}A\text{—}N\text{=}C\text{=}O$$

(III)

in which

A and $R_2$ have the meaning stated above.

It must be regarded as definitely surprising that the thiocarbamic acid-S-esters obtainable according to the invention have such strong fungicidal properties, since compounds of similar chemical structure have hitherto not been known to possess a high fungicidal activity.

When the process according to the invention is started from mercapto-benzimidazole and 1-chloro-6-isocyanatohexane, the reaction can be illustrated by the following reaction scheme:

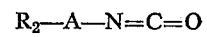

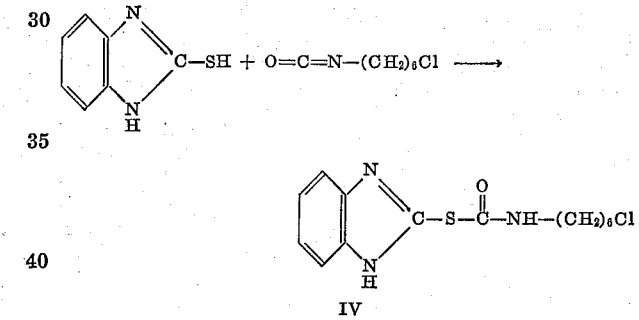

IV

The starting materials are clearly characterised by the above Formulae II and III. In these formulae, $R_1$ preferably denotes alkyl with 1–6 carbon atoms, alkoxy with 1–4 carbon atoms, chlorine and bromine; A preferably means alkylene with 1–8 carbon atoms, and $R_2$ chiefly denotes chlorine, bromine, alkoxy with 1–10 carbon atoms, haloalkoxy with 1–10 carbon atoms and containing chlorine and/or bromine, alkylcycloalkoxy with 1–10 carbon atoms, and alkylmercapto with 1–6 carbon atoms.

Examples of 2-mercapto-benzimidazoles which can be used according to the invention as starting materials, are:
2 - mercapto - benzimidazole, 4 - methyl-, 5 - methyl-, 6-methyl-, 4,5-dimethyl-, 5-methyl-6-tert.butyl-, 5-methoxy-, 5-ethoxy-, 6-ethoxy-, 4-chloro-, 5-chloro-, 6-chloro-, 5,6-dichloro-, 5-bromo-, 4-bromo-5-methyl and 6-bromo-2-mercaptobenzimidazole.

As examples of isocyanic acid esters to be used according to the invention there may be mentioned: 1-chloro-ethyl-2-, 1-chloro-propyl-3-, 1-chloro-butyl-4-, 1-chloro-hexyl - 6-, 1 - chlorobutoxy-propyl-, methoxy-methyl-, methoxy - propyl-, ethoxy-propyl-, i-butoxy-propyl-, 2-methyl-cyclohexyloxy-propyl-, i-octyloxy-propyl-, 2-ethyl-hexoxy-propyl-isocyanate.

Suitable diluents are all inert organic solvents, such as chlorinated hydrocarbons, e.g., ethylene chloride, dichloro-benzene or nitrobenzene, but also ketones, such as cyclohexanone, as well as dimethyl formamide, dimethyl sulphoxide and pyridine, or mixtures of these solvents. However, it is also possible to work without a solvent. Lower aliphatic alcohols, such as methanol and isopropanol may also be used.

As catalytically active bases, amines are chiefly used, preferably tertiary amines, such as triethylamine and pyridine.

The reaction temperatures can be varied within a fairly wide range. In general, the process is carried out between 0° and 180° C., preferably between 10° and 100° C.

For carrying out the process according to the invention, about 1 mol of isocyanic acid ester is used per mol of 2-mercapto-benzimidazole, but it is also possible to use an excess of isocyanic acid ester. The reaction and the working up are carried out in the usual manner.

The substances according to the invention have a strong fungitoxic effect and are distinguished by a broad spectrum of activity. Due to their low toxicity towards warm-blooded animals, they are suitable for combating undesirable fungus growth. Their good compatibility with higher plants enables them to be used as plant protective agents against fungus diseases.

The compounds according to the invention have proved especially satisfactory for controlling rice diseases. They have an excellent protective effect when combating *Piricularia oryzae* and *Cochliobolus miyabeanus* in rice.

The compounds according to the invention also have a particularly good activity against a number of other fungi, such as species of Mycosphaerella and Cercospora, and against *Botrytis cinerea*. They also have a fungitoxic effect on fungi which attack the plants from the soil, sometimes causing tracheomycoses, such as *Phialophora cinerescens* and *Verticillium alboatrum*.

Since the compounds according to the invention, as leaf fungicides, have mainly a protective effect, a mixture with curative agents is advantageous. Organic mercury compounds, such as phenyl-mercury acetate, and also antibiotics, such as Blasticidin S, are suitable for this purpose. By adding the compounds according to the invention, a substantial reduction of the mercury content can be achieved in the mixed preparation. The disadvantages occurring when organic mercury compounds are used by themselves, such as the high toxicity towards warm-blooded animals, can thus be reduced. By combining preparations of protective and of curative effect, as in the mixture mentioned above, an increased effectiveness can be attained.

The compounds according to the invention can be transformed into the usual formulations, such as emulsifiable concentrates, spray powders, pastes, soluble powders, dusts and granulates. These are prepared in known manner, for example by extending the active ingredients with solvents and/or carriers, if desired with the use of emulsifiers and/or dispersing agents (cf. Agricultural Chemicals, March 1960, pages 35–38). Suitable auxiliaries for this purpose are mainly solvents, such as aromatics (e.g., xylene, benzene), chlorinated aromatics (e.g., chlorobenzenes), paraffins (e.g., petroleum fractions), alcohols (e.g., methanol, butanol), amines (e.g., ethanolamine, dimethyl formamide), and water; carriers, such as natural rock flours (e.g., kaolins, aluminas, talc, chalk) and ground synthetic stone (e.g., highly dispersed silicic acid, silicates); emulsifiers, such as non-ionic and anionic emulsifiers (e.g., polyoxyethylene-fatty acid esters, polyoxyethylene-fatty alcohol ethers, alkylsulphonates and arylsulphonates), and dispersing agents, such as lignin, sulphite waste liquors, and methyl cellulose.

The active compounds according to the invention can be present in the formulations in admixture with other known active ingredients.

The formulations generally contain between 0.1 and 95, preferably between 0.5 and 90, percent by weight of active compound.

The compounds to be used or their preparations are applied in the usual manner, for example by spraying, dusting, sprinkling or atomizing. The active ingredient can be used in concentrations between 0.2 and 0.005 percent, dependent upon the intended application. In special cases, however, it is also possible to exceed or to remain below this range of concentration.

The following examples are given for the purpose of illustrating the invention.

*Example A*

Piricularia test/liquid preparation of active compound:
Solvent _____ 1    part by weight acetone.
Dispersing agent   0.05 part by weight sodium oleate.
Other additives __ 0.2  part by weight gelatin.
Water _____ 98.75 parts by weight $H_2O$.

The amount of active compound required for the desired concentration of the active compound in the spray liquid is mixed with the stated amount of solvent, and the concentrate obtained is diluted with the stated amount of water containing the stated additives.

Thirty rice plants which are about 14 days old are sprayed with the spray liquid until dripping wet. The plants remain in a greenhouse at temperatures of 22 to 24° C. and at a relative atmospheric humidity of about 70%. They are then inoculated with an aqueous suspension of 100,000 to 200,000 spores/ml. of *Piricularia oryzae* and placed in a room at 24–26° C. and at a relative atmospheric humidity of 100%.

Five days after inoculation, the infestation of all the leaves of the treated plants, which were present at the time of inoculations, are determined as a percentage of the untreated, but also inoculated control plants. 0% means that no infestation occurred, and 100% means that the infestation is exactly the same as that of the control plants.

The active compounds, their concentrations and the results obtained can be seen from the table below (Table 1).

*Example B*

Piricularia test/solid preparation of active compound:
Solvent, parts by weight acetone _____  10
Dust base.—100 parts by weight:
    Calcium carbonate, percent _____ 95.5
    Silicic acid, percent _____  4.0
    Mg stearate, percent _____  0.5

The amount of active compound required for the desired concentration of the active compound in the dusting agent is mixed with the stated amount of solvent, and the concentrate obtained is triturated in a mortar with the stated amount of dust base, until the solvent has evaporated.

Thirty rice plants which are about 14 days old, are dusted with this agent. They are then inoculated with an aqueous suspension of 100,000 to 200,000 spores/ml. of *Piricularia oryzae* and placed in a room at 24–26° C. and a relative atmospheric humidity of 100%.

Five days after inoculation, the infestation of all the leaves of the treated plants, which were present at the time of inoculation, are determined as a percentage of the untreated, but also inoculated control plants. 0% means that no infestation occurred, and 100% means that the infestation is exactly the same as that of the control plants.

The active compounds, their concentrations and the results obtained can be seen from the following Table (Table 1):

temperature of about 42° C., and then poured into Petri dishes of 9 cm. diameter. Control dishes without the active compound are also provided.

TABLE 1

Piricularia test/liquid preparation of active compound=l
Piricularia test/solid preparation of active compound=s

| Active compound | Infestation in percent of infestation of untreated control at a concentration of active compound of (percent)— | | |
|---|---|---|---|
| | 0.1 | 0.05 | 0.01 |
| 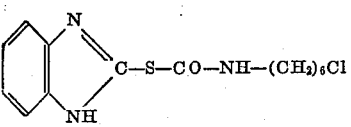 | | | |
| l | | 0 | 75 |
| s | | 9 | 13 |
| 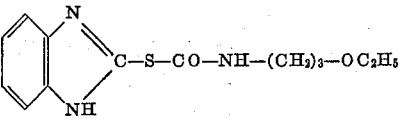 | | | |
| l | | 0 | 29 |
| s | 0 | 10 | |
| 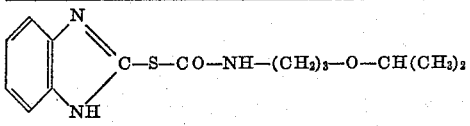 | | | |
| l | | 0 | 62 |
| s | 25 | 80 | |
| 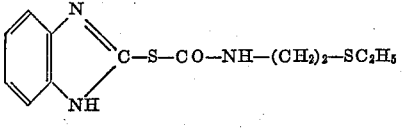 | | | |
| l | | 0 | 1 |
| s | 8 | 10 | |

*Example C*

Mycelium growth test—Nutrient medium:
Parts by weight powdered agar-agar _____ 20
Parts by weight malt extract _____ 30
Parts by weight distilled water _____ 950

Ratio of solvent to nutrient medium:

Parts by weight actone _____ 20
Parts by weight agar nutrient medium _____ 100

The amount of active compound required for the desired concentration of the active compound in the nutrient medium is mixed with the stated amount of the solvent. The concentrate obtained is thoroughly mixed in the stated ratio with the liquid nutrient medium which has a temperature of about 42° C., and then poured into Petri dishes of 9 cm. diameter. Control dishes without the active compound are also provided.

When the nutrient medium has cooled and solidified, the dishes are inoculated with the fungi specified in the table, and incubated at about 21° C.

Evaluation is carried out after 4–10 days, dependent upon the rate of growth of the fungi. For evaluation the radial mycelium growth on the treated nutrient media is compared with the growth on the control medium. The evaluation of the mycelium growth is made as follows:

0—No mycelium growth;
1—Very strong inhibition of growth;
2—Medium inhibition of growth;
3—Slight inhibition of growth;
4—Growth equal to that of untreated control.

TABLE 2.—MYCELIUM GROWTH TEST

| Active compound | Conc. of active compound/ p.p.m. | Fungi | | | | | | | |
|---|---|---|---|---|---|---|---|---|---|
| | | Piricularia oryzae | Cochliobolus miyabeanus | Mycosphaerella musicola | Cercospora personata | Cercospora cofeicola | Botrytis cinerea | Phialophora cinerescens | Verticillium alboatrum |
| 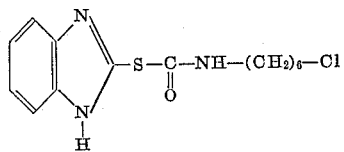 C—S—CO—NH—(CH₂)₆Cl | 500 / 100 | 2 / 4 | 2 / 4 | 3 / 4 | 0 / 1 | ---------- | 2 / 4 | 2 / 4 | 1 / 2 |
| 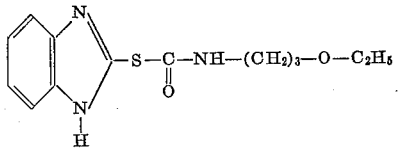 C—S—CO—NH—(CH₂)₃—OC₂H₅ | 500 / 100 | 2 / 4 | 2 / 3 | ---------- | 1 / 4 | ---------- | 1 / 4 | 2 / 3 | 1 / 2 |
| 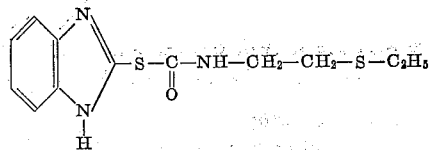 C—S—CO—NH—(CH₂)₃—O—CH(CH₃)₂ | 500 | 1 / 4 | 1 / 3 | 0 / 2 | 0 / 3 | 0 / 2 | ---------- | 0 / 1 | 1 / 2 |

The active compounds, their concentration and the results obtained can be seen from the following table (Table 2):

zene and 50 ml. of dimethyl formamide at 50° C. for 4 hours. After distilling off the solvent and squeezing the slightly greasy residue on clay, 26.8 (63.6% of the theoretical) remain as yield: M.P. 163° C. (from ethanol).

The following compounds are prepared in analogy to the process described above:

Example 1

N-(6-chlorohexyl)-thiocarbamic acid-S-(2)-benzimidazolyl ester 42.0 g. of 1-chlorohexyl-6-isocyanate, 30.0 g. of 2-mercapto-benzimidazole and 2 ml. of pyridine are heated at 60° C. for 6 hours, while stirring. The initially thinly liquid, white slurry gradually solidifies. After cooling, the dirty-white residue is stirred with 100 ml. of petroleum ether and filtered off with suction. Yield 61.2 g. (98.7% of the theoretical); white crystals of M.P. 150–160° C.

Example 2

N-(3-ethoxy-propyl)-thiocarbamic acid-S-(2)-benzimidazolyl ester 15.0 g. of 2-mercapto-benzimidazole, 13.0 g. of 3-ethoxypropyl isocyanate and 2 ml. of pyridine are dissolved in 100 ml. of dimethyl formamide and heated at 50° C. for 4 hours. The solvent is then distilled off in a vacuum, the remaining solid residue is washed with ethanol and then dried. Yield 26.8 g. (96.0% of the theoretical); M.P. 156–157° C.

Example 3

N-(2-ethylmercapto-ethyl)thiocarbamic acid-S-(2)-benzimidazolyl ester 22.5 g. of 2-mercapto-benzimidazole, 20.7 g. of 95% 2-ethylmercaptoethyl isocyanate and 1 ml. of pyridine are heated in a solvent mixture of 50 ml. of 1,2-dichloroben-

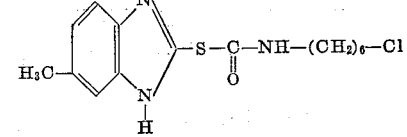

N-(6-chloro-hexyl)-thiocarbamic acid-S-(2)-[6-methyl]-benzimidazolyl ester: M.P. 271° C.

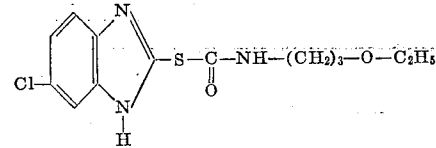

N-(3-ethoxy-propyl)-thiocarbamic acid-S-(2)-[6-chloro]-benzimidazolyl ester: M.P. 257° C.

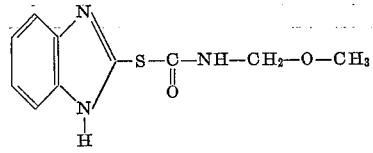

N-(methoxy-methyl)-thiocarbamic acid-S-(2)-benzimidazolyl ester: M.P. 115° C.

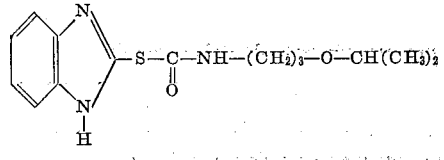

N-(3-isopropoxy-propyl)-thiocarbamic acid-S-(2)-benzimidazolyl ester: M.P. 138° C.

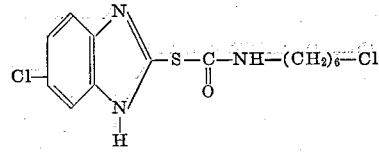

N-(6-chloro-hexyl)-thiocarbamic acid-S-(2)-[6-chloro]-benzimidazolyl ester: M.P. 167–169° C.

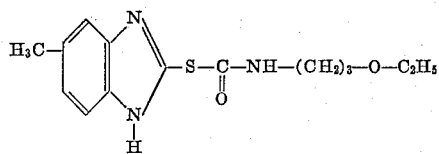

N-(3-ethoxy-propyl)-thiocarbamic acid-S-(2)-[5-methyl] benzimidazolyl ester: M.P. 290° C.

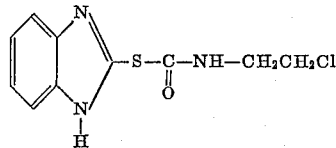

N-(2-chloro-ethyl)-thiocarbamic acid-S-(2)-benzimidazolyl ester: M.P. 167° C.

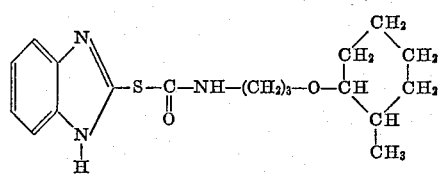

N-[3-(2-methyl)-cyclohexoxy-propyl-thiocarbamic acid-S-(2)-benzimidazolyl ester: M.P. 149–50° C.

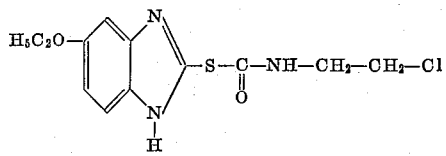

N-(2-chloro-ethyl)-thiocarbamic acid-S-[2-(5-ethoxy)-benzimidazolyl] ester: M.P. 172° C.

We claim:
1. A compound of the formula

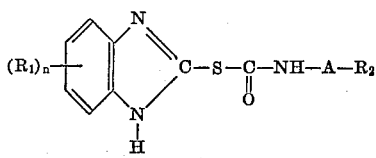

in which
$R_1$ is individually defined as a member selected from the group consisting of hydrogen, lower alkyl of 1–6 carbon atoms, lower alkoxy of 1–4 carbon atoms and halo;
A is alkylene of 1–10 carbon atoms;
$R_2$ is individually defined as a member selected from the group consisting of halo, alkoxy of 1–10 carbon atoms, haloalkoxy of 1–10 carbon atoms, lower alkyl cycloalkoxy of 1–10 carbon atoms and alkyl mercapto of 1–6 carbon atoms; and
$n$ is an integer of 1–2.
2. A compound of the formula

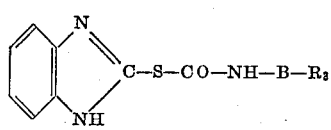

in which
B is an alkylene of 1–8 carbon atoms and
$R_3$ is alkoxy of 1–10 carbon atoms.

3. A compound of the formula

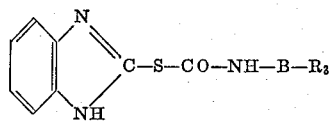

in which
B is an alkylene of 1–8 carbon atoms; and
$R_3$ is an alkylmercapto of 1–6 carbon atoms.

4. A compound of the formula

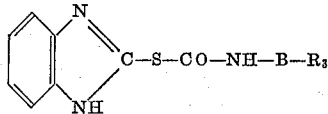

in which
B is defined as alkylene of 1–8 carbon atoms; and
$R_3$ is chloro.

5. A compound of the formula

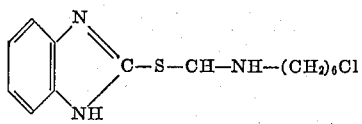

6. A compound of the formula

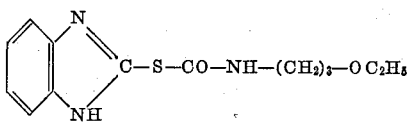

7. A compound of the formula

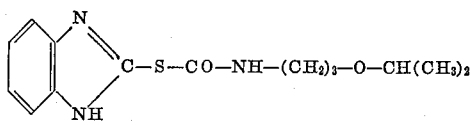

8. A compound of the formula

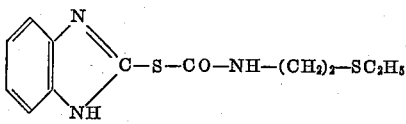

References Cited
UNITED STATES PATENTS

| | | | |
|---|---|---|---|
| 2,882,140 | 4/1959 | Searle | 260—455 |
| 2,901,499 | 8/1959 | Tilles et al. | 260—455 |
| 2,916,370 | 12/1959 | Tilles et al. | 260—455 |
| 2,983,747 | 5/1961 | Campbell et al. | 260—455 |
| 3,046,189 | 7/1962 | Jacobi et al. | 260—455 |
| 3,113,136 | 12/1963 | Wagner | 260—309.2 |
| 3,113,948 | 12/1963 | Zellner | 260—309.2 |
| 3,136,689 | 6/1964 | Miller | 167—33 |
| 3,142,694 | 7/1964 | Metivier | 260—455 |
| 3,146,161 | 8/1964 | Grewe | 167—33 |

OTHER REFERENCES

Macko Chem. Abst., vol. 53, column 3204 (1959).
Mamedov et al.: Izvestia Akad. SSSR. Ot del. Khim. Nauk, 1964, page 700 relied on (April 1964).

WALTER A. MODANCE, *Primary Examiner.*

S. J. FRIEDMAN, N. TROUSOF, *Assistant Examiners.*